United States Patent [19]
Thomson

[11] Patent Number: 5,113,739
[45] Date of Patent: May 19, 1992

[54] MUSICAL CALCULATOR

[76] Inventor: Pamela J. Thomson, 4/254 Moore Pk Rd., Paddington NSW, Australia 2021

[21] Appl. No.: 191,145
[22] PCT Filed: Jul. 3, 1987
[86] PCT No.: PCT/AU87/00200
  § 371 Date: Mar. 1, 1988
  § 102(e) Date: Mar. 1, 1988
[87] PCT Pub. No.: WO88/00383
  PCT Pub. Date: Jan. 14, 1988

[30] Foreign Application Priority Data
  Jul. 4, 1986 [AU] Australia .................. PH06730

[51] Int. Cl.$^5$ ............................... G09B 15/02
[52] U.S. Cl. ............................. 84/473; 84/474
[58] Field of Search .......... 84/485 R, 485 SR, 473, 84/474, 470 R, 480, 481, 471 SR

[56] References Cited

U.S. PATENT DOCUMENTS

| | | | |
|---|---|---|---|
| 1,556,147 | 10/1925 | Johnson et al. | 84/485 SR |
| 2,001,191 | 5/1935 | Golden | 84/485 SR |
| 2,925,750 | 2/1960 | Capps | 84/481 X |
| 2,958,251 | 11/1960 | Calabro | 84/473 |
| 3,001,435 | 9/1961 | Duffy et al. | 84/474 |
| 3,481,241 | 12/1969 | Gaillard | 84/470 X |
| 4,069,737 | 1/1978 | Anderson | 84/485 SR |
| 4,134,326 | 1/1979 | Hutton | 84/474 |
| 4,602,550 | 7/1986 | Dadi et al. | 84/473 |
| 4,748,890 | 6/1988 | Tutaj | 84/485 SR |

*Primary Examiner*—Brian W. Brown

[57] ABSTRACT

This invention relates to a calculator and is more specifically concerned with a calculator for enabling a musician to visualize and organize transitions between scales, modes, etc.

The present invention provides a calculator having musical notation in which the notes are equi-spaced and arranged in parallel rows on respective elements each of which is independently movable in the direction of the row with respect to neighboring elements, masks overlapping respective elements and individually movable in the direction of the row of notes on the element beneath, each mask corresponding to a particular musical scale or mode and having opaque and transparent sections alternating with one another to expose through the mask only those notes of the row beneath which are used in the scale or mode denoted by the mask.

The calculator may be embodied as a flat sheet or it may be cylindrical in which the parallel rows are formed into rings individually rotatable about a common axis.

7 Claims, 6 Drawing Sheets

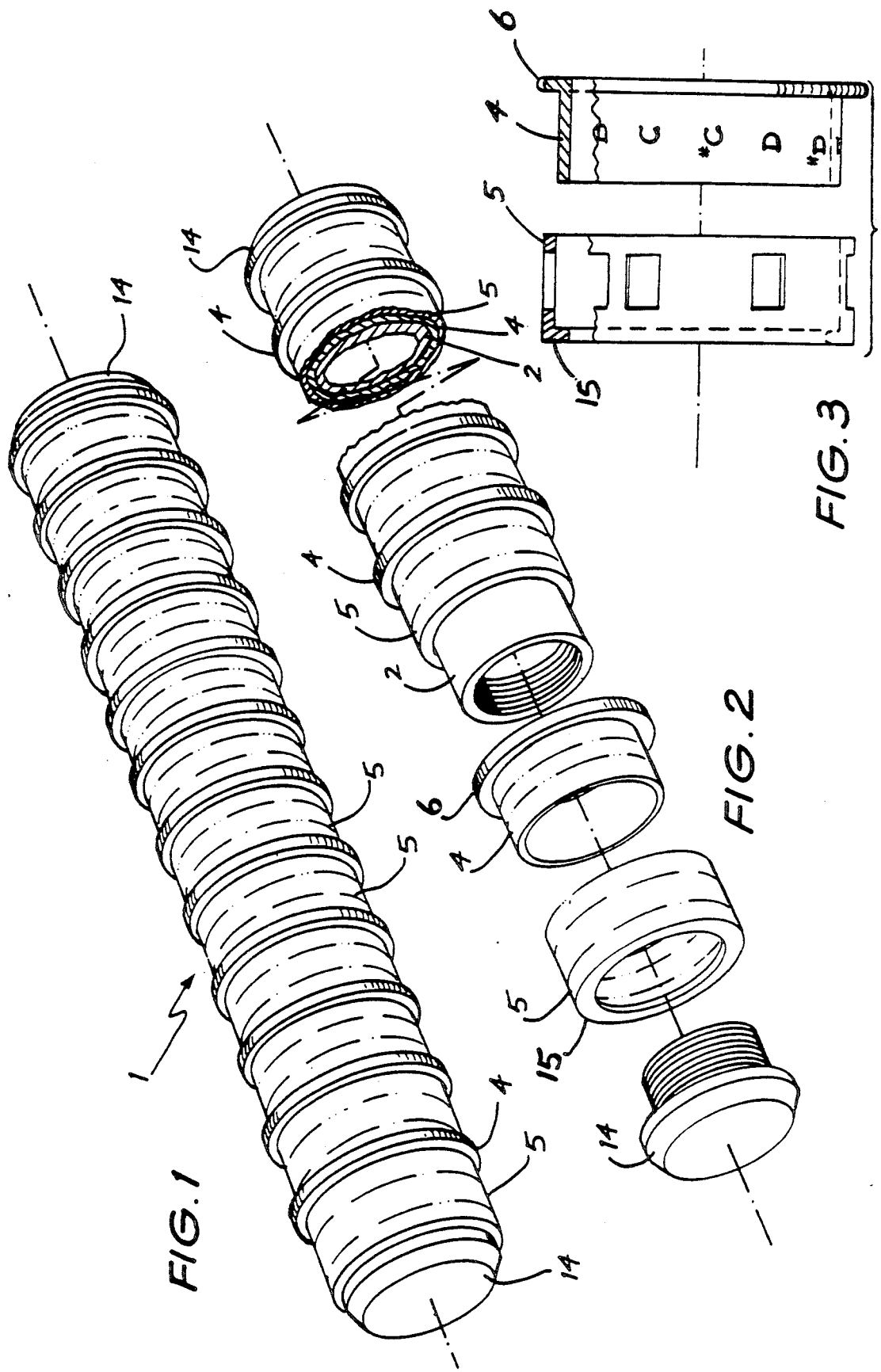

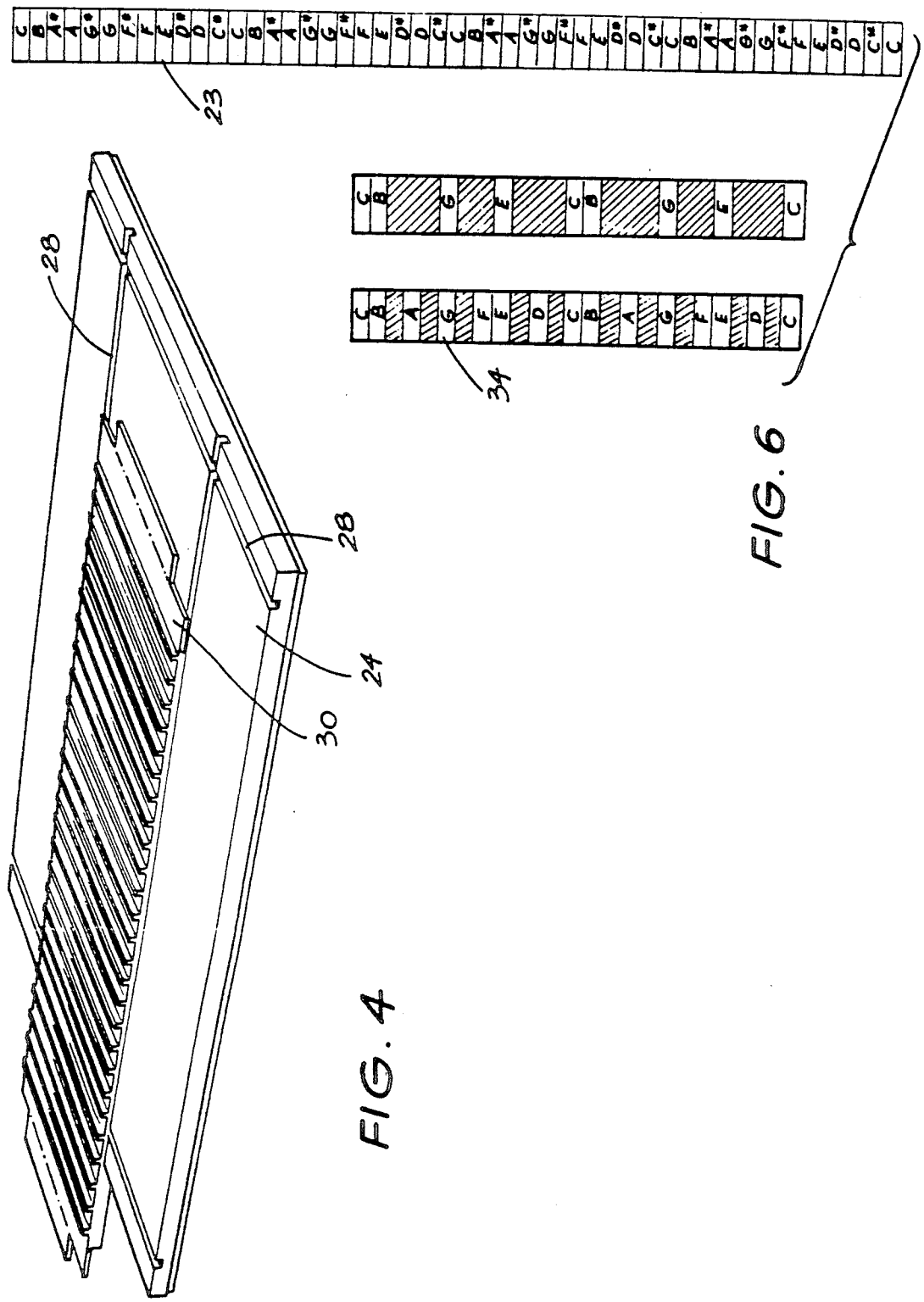

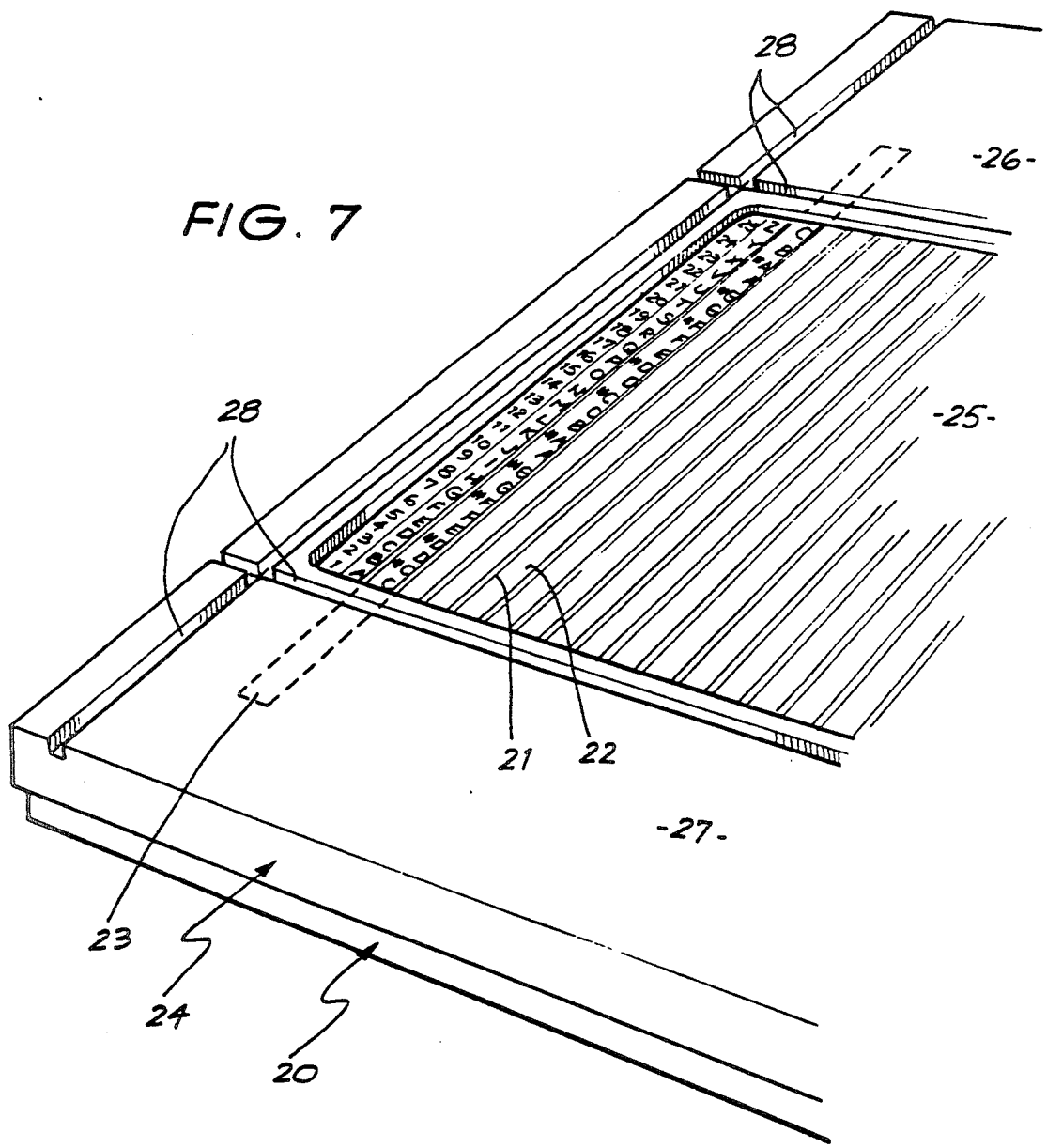

MUSICAL CALCULATOR

This invention relates to a calculator and is more specifically concerned with a calculator for enabling a musician to visualise and organise transitions between scales, modes, chords, melody lines, bass lines, fractions, colour, numerals, timber and the alphabet and to work more easily within a series of chosen scales, etc.

In co-pending Australian patent Application No. 28219/84 filed on 16th Apr. 1984 and entitled "Sliding Musical Scale Device" the present inventor has described a calculator comprising two flat sheets one of which provides a mask slidable over the other. The undersheet is marked with musical notation arranged in a row of parallel columns each representing a recurring cycle of notes, the starting note at the foot of each column having a pre-arranged progression, for example a fifth, with respect to the starting note of the preceding column and also shows how to transpose the modes of the Ionian Major Scale into 4th/5th's from their tonic and then transposes the beforesaid modes and scale into 4th's and 5th's.

The masking sheet is formed with windows and opaque sections, also arranged in columns and each registering with a respective note position on the underlying sheet. Each row of windows and opaque sections is labelled to identify a particular type of musical scale or mode represented by the column, and the notes visible through the windows of each column represent those used in that particular mode or scale.

Although the calculator of the co-pending application is useful in enabling students of music to visualise the relationship between musical scales and modes, it has insufficient versatility for a composer who may require to change the relationship of the notes of the columns with respect to one another and to vary the order of the columns and insufficient versatility to write melody lines, bass lines etc.

In accordance with a first aspect of the invention, a calculator has musical notation in which the notes are equi-spaced and arranged in parallel rows on respective elements each of which is independently movable in the direction of the row with respect to neighbouring elements, masks overlapping respective elements and individually movable in the direction of the row or notes on the element beneath, each mask corresponding to a particular musical scale or mode and having opaque and transparent sections alternating with one another to expose through the mask only those notes of the row beneath which are used in the scale or mode denoted by the mask.

Preferably when the calculator is made in a planar configuration the length of the element is substantially greater than the length of the mask and conveniently the element is movable in either direction with respect to its length a distance of at least one complete octave. In one such arrangement the element is in a slideway six octaves long and is itself four octaves long. The mask is suitably two octaves long and may be arranged in a transparent platen which can be moved perpendicularly to the longitudinal direction of the elements beneath.

In accordance with a second aspect of the invention, a calculator has musical notation arranged in circles each representing a scale or mode and in which the notes are equi-angularly spaced from one another, and masking rings superimposed over respective circles and individually rotatable about an axis common to the circles and rings, each masking ring having a circular array of transparent and opaque sections registering with the positions of respective notes in the circle beneath, so that the notes exposed in the transparent sections or windows correspond to those of the mode or scale represented by the ring.

A calculator in accordance with a third aspect of the invention has a set of rings individually rotatable about a common axis and arranged in positionally interchangeable pairs with one ring of each pair covering the other ring of the pair, each covered ring carrying a equi-angularly spaced positions notes of a chromatic scale, and the covering ring of the pair providing a mask identified as a particular scale or mode and having circumferentially distributed opaque sections and windows through which are exposed only the notes of the particular type of scale or mode represented by the masking ring.

Preferably the calculator comprises pairs of coaxially arranged cylindrical collars, the inner collars having the circle of musical notation arranged around its outside surface and the outer collar providing the mask. The inner collars have the same diameter preferably, so that any mask can be fitted over any collar. However if the collar pairs can be arranged in any order it does not matter if the collars of one pair have a different diameter or width to the collars of another pair.

Suitably, an indexing mechanism is provided to enable the masks and collars beneath to be individually located in any one of a number of predetermined angular positions. This may be achieved by providing each collar with a circular groove on its inside surface from which protrude sections of an undulating steel spring. The collars are conveniently threaded on a cylindrical former provided with longitudinally-extending flutes corresponding to the number of indexed positions required. The collar is then positively located in any one of those positions by the engagement of the protruding sections of the spring with the flutes.

The invention will now be described in more detail, by way of examples, with reference to the accompanying drawings, in which:

FIG. 1 shows parts of a cylindrical calculator;

FIG. 2 shows the calculator partially exploded and partially cut away to illustrate internal detail;

FIG. 3 shows in developed form a pair of superimposed collars or rings used in the calculator; and, FIGS. 4 to 6 show respectively a planar form of calculator: in diagrammatic form partially broken away; exploded; and, in plan, the legend which appears on two sliders used in the calculator;

FIG. 7 shows a preferred method of interlocking the movement of parts of the calculator of FIG. 4.

Figure 5:
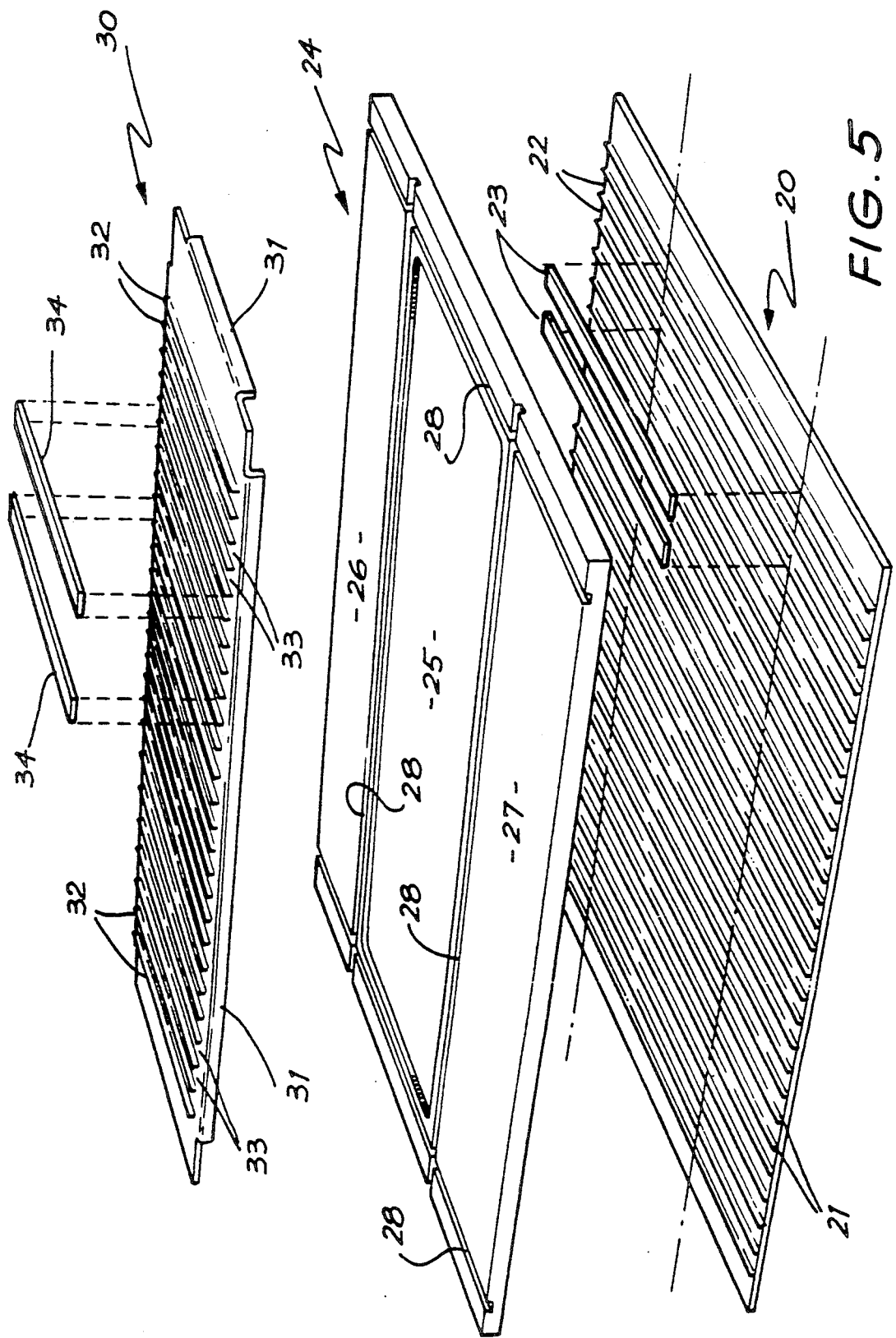

The calculator 1 of FIGS. 1 and 2 has a cylindrical former 2 internally threaded at its ends and carrying pairs of separately rotatable superimposed rings 4 and 5. Inner ring 4 is externally marked at equi-angularly spaced positions with the twelve notes making a recurring cycle in the Lydian mode, as is clearly shown in FIG. 3. Each ring 4 is provided at one end with an outwardly-radial flange 6 having a knurled rim which projects beyond the ring 5 and enabling the ring 4 to be individually turned to any angular position. An indexing or detent mechanism (not shown) which is easily overcome by finger pressure, holds the ring in any position to which it is moved. The mechanism is conveniently of the watch bezel type referred to earlier in this specification, and using an undulating steel spring captured in a circular groove formed around the inside of the flange. Protruding sections of the spring can engage in respective notches formed by grooves extending lengthwise of the former in its external surface.

The outer ring 5 of the pair is formed as a mask having circumferentially spaced windows and opaque sections, as shown in FIG. 4, and carrying legend indentifying the scale or mode represented by the ring 5. In one example of the invention the masking rings 5 are respectively identified as:

|  |  |
| --- | --- |
| LYDIAN | MODE |
| IONIAN | MAJOR SCALE |
| MIXO-LYDIAN | MODE |
| DORIAN | MODE |
| AEOLIAN MINOR | MODE |
| PHRYGIAN | MODE |
| LOCRIAN | MODE |
| CHROMATIC | SCALE |
| HARMONIC MINOR | SCALE |
| BLUES | SCALE |
| SCRIABINS MYSTIC | SCALE |
| WHOLE TONE RAJA | SCALE |

It will be appreciated that other scales or modes may also be used, such as JAPANESE SCALES, HEJAZ, PENTATONIC, etc or modes of these scales. The ring 4 denoting the Lydian Mode, is shown in FIG. 3.

It will be appreciated that any chord may be used such as major, minor, diminished, augmented, etc. You may also form your own scale, mode, chord, melody line or bass line, etc with spare clear plastic strips and an erasable pen.

The masking ring 5 is provided on one rim with an inwardly-directed rim flange 15 which abuts against the adjacent edge of the inner ring or collar 4 at its end opposite its outwardly extending flange 6. The collar 15 has on its inside surface an annular groove (not shown) housing the undulating spring providing a indexing mechanism referred to earlier and already described with reference to the ring 4.

A retaining cap 14 is screwed into each end of the former 2 to hold the sets of rings in place.

The calculator is used by arranging the pairs of rings on the former in the order in which the user is to progress from one mode or scale to the next. This is simplified by the ring pairs forming units which can individually be removed from and returned to the former. To facilitate the replacement of the ring units, the end of the former can be bevelled so that the protruding sections of the springs of the mechanisms which locate the rings in chosen angular positions, slide smoothly onto the bevelled end of the former. The user then turns the underlying collars or rings by means of their radial flanges, to bring their starting positions into alignment with a chosen progression, and finally moves the masking rings individually to the desired positions to tell him the order of the notes in the scale or mode in which he is working.

In the case of the Locrian Mode, Chromatic and Harmonic minor scales, some of the note positions on the underlying rings carry two notes instead of one. This occurs when the same note position in the scale can be represented in either of two ways according to the scale in use. Any scale mode etc may be used with these double notes. Also certain ring configurations may be denoted as a "#" (sharp) column or ring or as a "b" (flat) column or ring.

The invention is of particular value in programming electronically synthesized music as it enables the composer to use computer programmes by applying the logic derived from the calculator.

The calculator shown in FIGS. 4 and 5 is of planar form and comprises a rectangular flat base 20 having shallow parallel walls 21 on its upper face defining the sides of a set of channels providing slideways 22 in which are respectively located twenty-five strip sliders 23. Each slider 23, two of which are shown in FIG. 5, is four octaves long and has its upper face provided with musical notation as shown in FIG. 6. Each of the slideways 22 is six octaves long which allows the slider 23 within it to be slid one octave in either direction from a central position.

The top of the base is covered by a sheet 24 having a central window 25 formed in it extending the length of the base and arranged perpendicularly to the slideways 22. The width of the window 25, measured in the direction of a slideway 22, is two octaves. Two opaque rectangular areas 26 and 27 of the sheet 24 respectively flank the window and have the same dimensions as it has.

Figure 8:
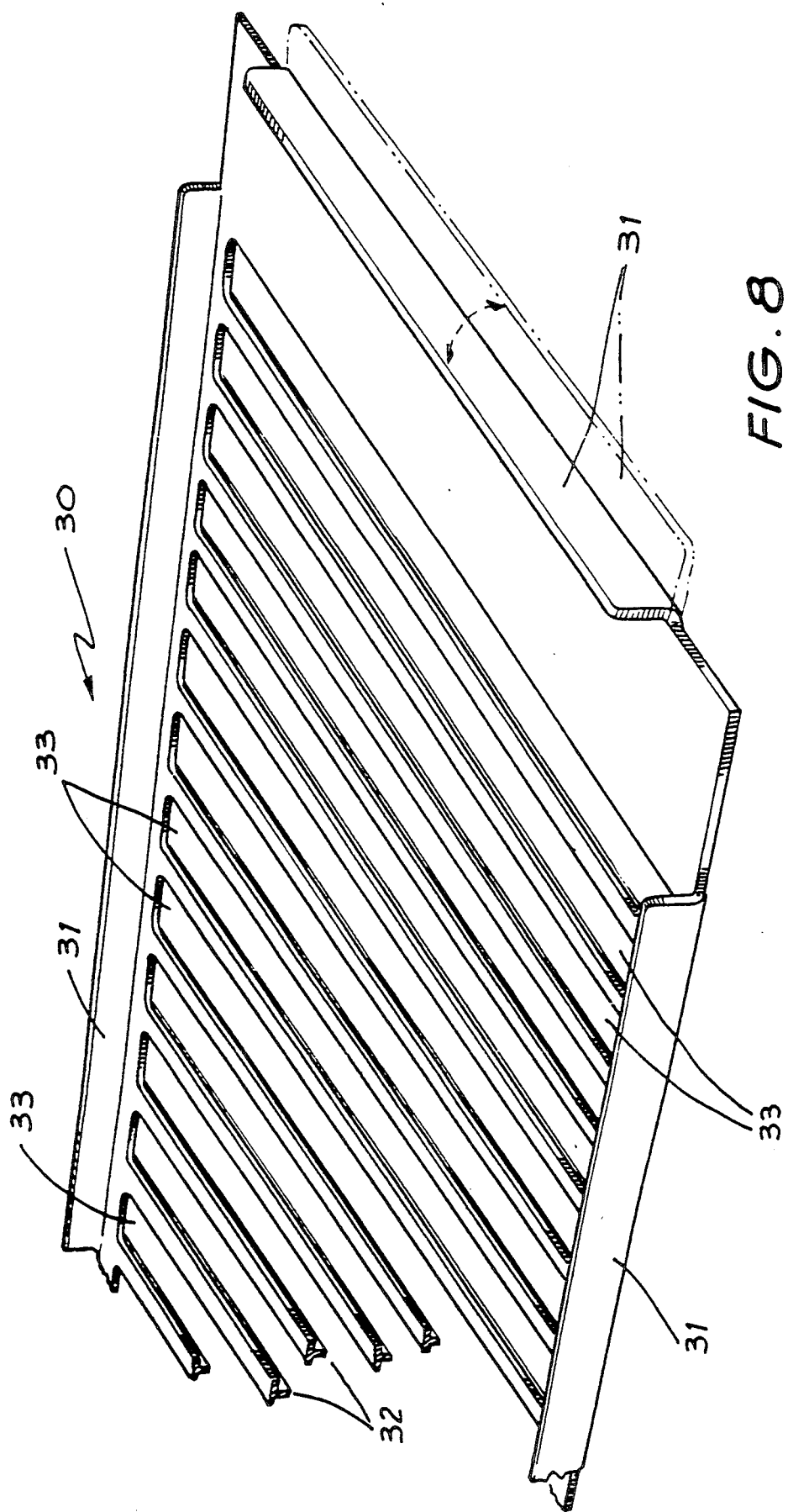
FIG. 8, shows a calculator of another embodiment used for translation of notes or chords, scales, modes, etc, for guitars.

The areas 26 and 27 each have a parallel channel 28 extending the length of the window 25 and disposed adjacent to it. Two further channels 28 are provided of respective ends of the window 25. The channels 28 provide guides for a transparent platen 30 able to move along or across the window 25. The platen 30 has ridges 31 extending along each edge and arranged to engage the channels 28 as shown in FIGS. 7 and 8. FIG. 7 shows the sheet 24 fitted to the base 20. FIG. 8 illustrates the under side of the platen 30 showing the ridges 31. The channels and ridges allow the platen 30 to move either across the sheet 24. If the platen is to be moved along the sheet, the ridges along the shorter sides of the platen are disengaged from their associated channels and the platen moved sideways sufficiently to allow the ridges to clear the channels and replaced in contact with the sheet such that the long ridges and their associated channels are still engaged. The platen may now slide freely along the sheet guided by the ridges engaged with the channels of the sheet. Similar steps are taken if the platen is to be moved across the sheet with the other ridges being disengaged from their associated channels.

The upper face of the platen 30 is formed with parallel walls 32 arranged to the slideways 22 and defining the sides of channels 33 each two octaves long. The tops of the walls 32 are slightly enlarged laterally, to retain within the channels respective masking slider 34 which are of the same width as the sliders 23 beneath, as shown in FIG. 6. One of the masking sliders 34 is shown in plan in FIG. 6 from which it will be seen to comprise a line of opaque and transparent sections which denote a particular musical scale or mode identified in writing on one end of the masking slider. The length of the masking slider 34 is two octaves. The order of the opaque and transparent sections on the masking sliders 34 will differ from one scale or mode to another.

The sliders 23 are first fitted into the slideways 22 and slid along them to appropriate positions to bring a desired order of notes on the sliders 23 into alignment with the lower edge of the window 25. A slight stiffness in the slideways 22 ensures that the sliders 23 remain in any position to which they are moved although, of course, they can be slid by finger pressure to different positions if desired.

The masking slides 34 are next slid into the channels 31 in the platen 30 in the order of progression of the scales and modes required by the user. The masking sliders expose in their windows only those notes relevent to the scale or mode marked on it. Finally the platen 30 is slid along the rails 28 until the first masking slider 34 is over the slider 22 the user wishes to employ first. By sliding the mask left to right, up or down over 20 and 24 you are able to transpose scale, mode, chord, melody lines, bass lines, etc, to any desired key.

The planar calculator of FIGS. 4 and 5 has the advantage that the user can see at all times the complete progression of scales and modes he wishes to employ in the portion of the composition he is working on. Also as it is flat, it is easily transported in bulk.

Figure 9:
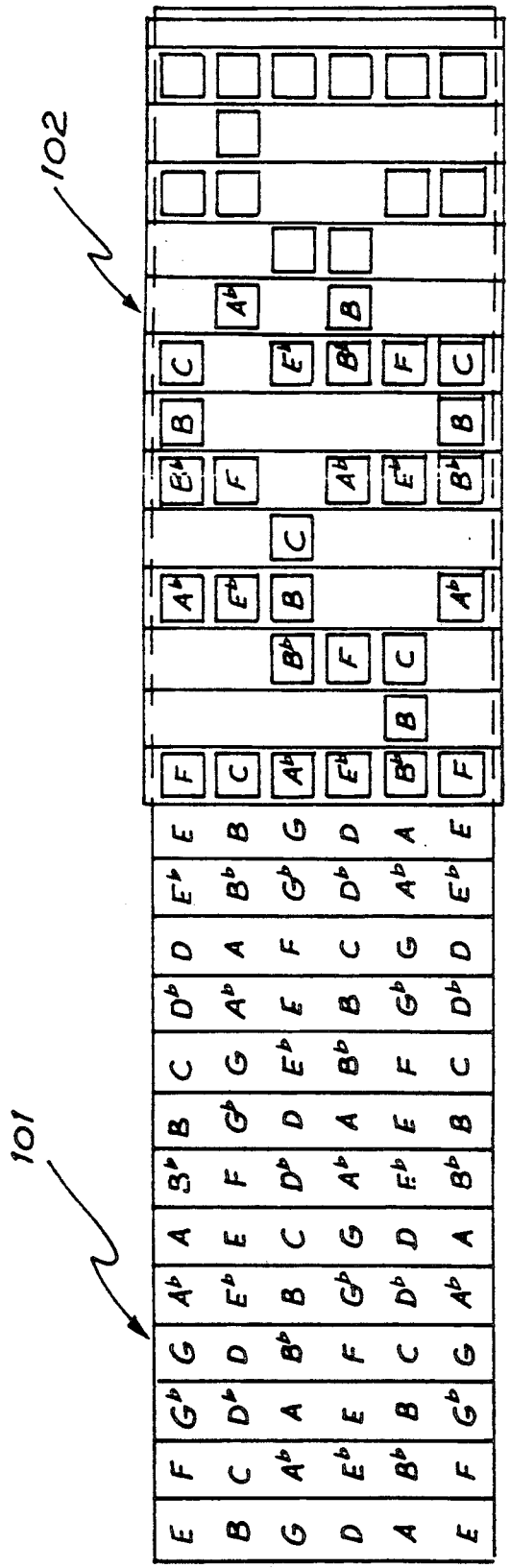
FIG. 9 shows a further embodiment of the invention using a slider slidable within a mask.

Another form of the invention as shown in FIG. 9, resides in a calculator used to calculate the required notes or chords to be played on a standard six string guitar. The calculator has a slider 101 which is slidable within a mask 102, the slider has depicted on its upper surface, the notes playable on the guitar. The notes are also arranged in order of play so that the slider also represents the location of the notes on the neck of the guitar. The mask 102 is opaque with a series of transparent window arranged to reveal the notes depicted on the slider in a predetermined manner. By this arrangement, notes, chords, melody lines, bass lines, etc, of one scale or mode may be transposed into another key as denoted by the mask being used. The calculator may be configured similarly for a 12 string guitar, violin, etc, in fact, any string instrument. This particular embodiment is a refinement of the previous embodiment as it should be appreciated that the previous embodiment can be arranged to represent the same configuration as each note position is changeable to represent any particular note or chord as required by the user. Likewise, the mask is also changeable to suit the translation or transposition required by the user.

Although the present invention in the description of the preferred embodiment, has been described with reference to scales and modes using musical notation, the inventor envisages the calculator as being able to be used to transpose all manner of different notations including, but not limited to scales, modes, chords, melody lines, bass lines, colour, number, fractions, alphabetic character and timber grains.

The claims defining the invention are as follows:

1. A musical calculator comprising:
   a cylindrical base having an outer surface and a first and second end;
   a plurality of first cylindrical rings, each of said first cylindrical rings includes an internal and external surface, each said internal surface is adapted for slidable engagement with said outer surface of said cylindrical former, each said external surface includes a plurality of equi-angularly spaced indicia each identifying a particular musical note;
   a plurality of second cylindrical rings, each of said second cylindrical rings includes an internal and an external surface, each internal surface is adapted to be slidably engaged with a corresponding one of each of said first cylindrical rings at said outer surface thereof for rotation relative thereto, each of said outer surfaces of said second cylindrical rings include a plurality of windows and opaque sections for exposing and covering a specific note represented by said indicia carried by said corresponding first cylindrical ring, each of said outer surfaces of said second cylindrical rings further include indicia for identifying a particular musical scale or mode related to the indicia disposed on each said corresponding first cylindrical ring.

2. The musical calculator as set forth in claim 1 further comprising end plugs removably attachable to said first and second ends of said cylindrical base so that said plurality of said first cylindrical rings with their corresponding second cylindrical ring may be positioned on said cylindrical base in any desired order relative to one another.

3. A musical calculator comprising:
   a base having a plurality of parallel walls defining channels therebetween;
   a plurality of strip sliders, each including musical indicia and provided in said channels of said base member;
   a cover sheet including a central window placed over said base;
   a transparent platen provided over the cover sheet in slidable relationship, said transparent platen including a plurality of parallel walls defining channels therebetween; and
   a plurality of masking slides provided in said channels of said transparent platen.

4. The musical calculator as set forth in claim 3, wherein said musical indicia on said plurality of strip sliders provided in said channels of said base include indicia representing eight musical octaves.

5. The musical calculator as set forth in claim 4, wherein said central window of said cover sheet has a width such that only six of said eight octaves of said indicia may be viewed therethrough at any one time.

6. The musical calculator as set forth in claim 5, wherein said masking strips have a length at least equal to the width os said window of said cover sheet.

7. The musical calculator as set forth in claim 3, further including means to retain sliding movement of said transparent platen in one of two orthogonal directions.

* * * * *